Feb. 22, 1966 J. B. McCARTHY CLIFTON 3,237,118
TRANSISTOR AMPLIFIER PROTECTION CIRCUIT
Original Filed Aug. 7, 1958
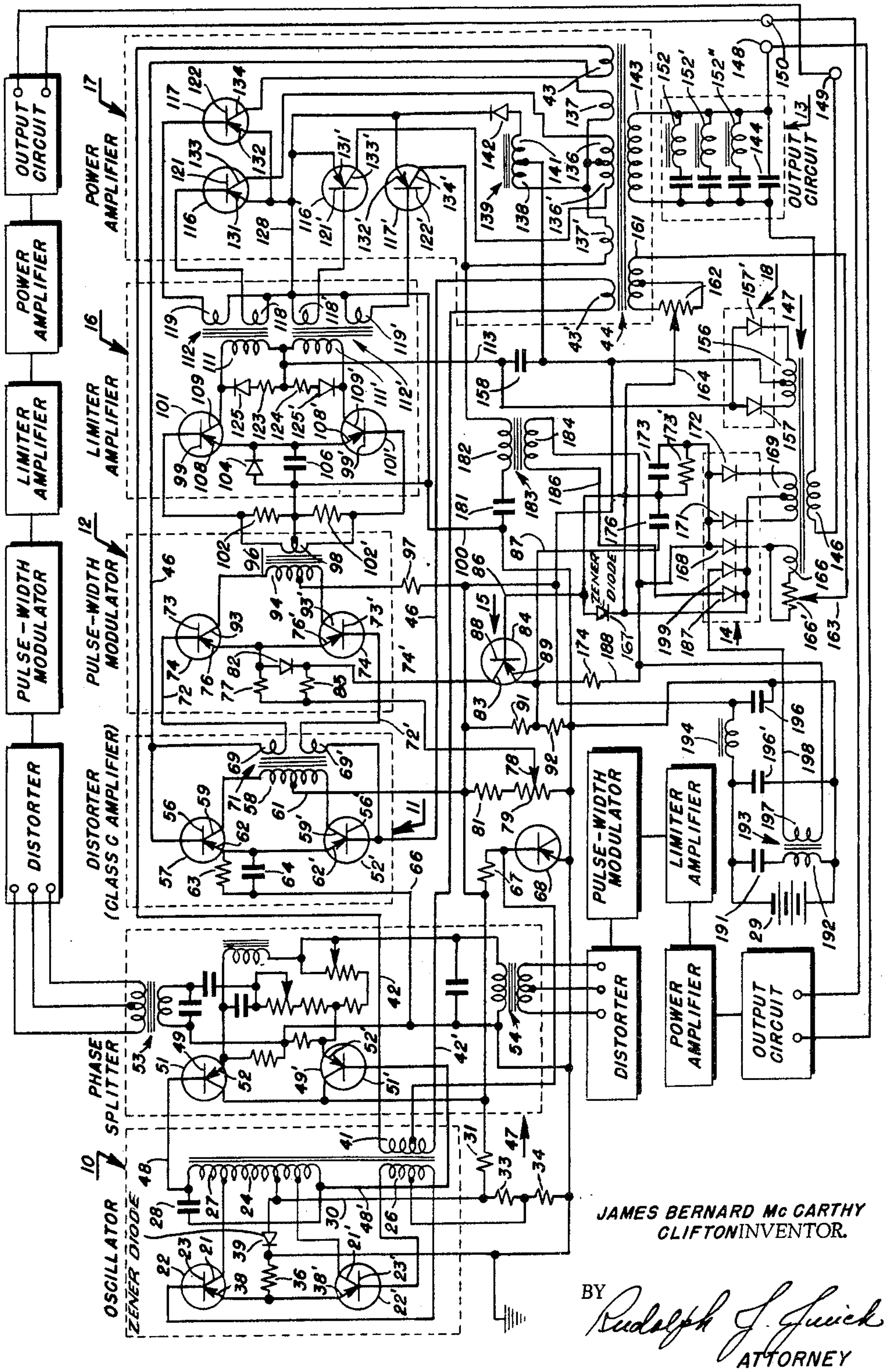
JAMES BERNARD McCARTHY CLIFTON INVENTOR.
BY Rudolph J. Juick
ATTORNEY

United States Patent Office 3,237,118
Patented Feb. 22, 1966

3,237,118

TRANSISTOR AMPLIFIER PROTECTION CIRCUIT

James Bernard McCarthy Clifton, Wanamassa, N.J., assignor to The Bendix Corporation, Eatontown, N.J., a corporation of Delaware Original application Aug. 7, 1958, Ser. No. 753,737, now Patent No. 3,125,726, dated Mar. 17, 1964. Divided and this application May 2, 1962, Ser. No. 191,996
2 Claims. (Cl. 330—15)

This invention relates to an improved protection circuit for transistor amplifiers.

This application is a division of my co-pending United States application Serial Number 753,737, now U.S. Patent No. 3,125,726, filed August 7, 1958, and entitled, "Apparatus For Converting D.-C. Power to A.-C. Power." The prior-filed application discloses a power inverter which comprises, essentially, an oscillator, having a substantially sine wave output, together with novel circuit means, including a pulse width modulator and limiting amplifier, for the production of symmetrical positive and negative pulses of the same repetition frequency as the sine wave oscillator output. These pulses, which are closely controlled in width and which are separated by intervals, or dwell periods of substantially no output, are fed to a power amplifier from which the useful alternating current output is obtained. The present invention is directed to the limiter amplifier, which is particularly adapted for use in the power inverter but which has utility in other electronic apparatus.

An object of this invention is the provision of a transistor amplifier, provided with means preventing damage to the transistors by transient voltages arising when the transistors are switched to the off condition.

An object of this invention is the provision of an electronic apparatus comprising a first transistor amplifier operating in a switching mode, a second push-pull transistor amplifier transformer coupled to the first amplifier, and means for preventing transient voltages from damaging the transistors of the first amplifier and for preventing runaway of the second amplifier.

These and other objects and advantages will become apparent from the following description when taken with the accompanying drawing. It will be understood, however, that the drawing is for purposes of illustration and is not to be construed as defining the scope or limits of the invention, reference being had for the latter purpose to the claims appended hereto.

It is here pointed out that the drawing, to which specific reference now is made, is FIGURE 2 in the parent application referred to hereinabove. The drawing shows a three-phase inverter which comprises three single phase inverters operating at the same frequency but at a phase angle of 120 degrees each from the other. Two phases of the system are shown in block diagram form, since they have identical counterparts in the one phase section which is shown in detail. Briefly, the device comprises an oscillator 10 providing a generally sine wave output of, say, 400 cycles per second. One output from the oscillator feeds a distorter, which may be a Class C amplifier. Another output from the oscillator is applied to a pulse width modulator 12, together with the output from the distorter, which modulator may be operated in an over-biased Class B mode by application of a controlled backward D.-C. bias on the transistors, the source of such backward bias including a signal from the output circuit 13 of the inverter. The signal from the distorter 11 adds to the sine wave signal of the oscillator to provide an input signal to the pulse width modulator, which is of increased slope, or steepness, in the vicinity of the positive and negative peaks thereof, as compared to a sine wave input alone. The output from the pulse width modulator, therefore, comprises alternate negative and positive going pulses, which are accurately and smoothly controlled in width by means of the D.-C. bias applied thereto from the inverter output circuit through the rectifier 14 and the D.-C. amplifier 15. Such controllable pulses from the pulse width modulator are applied to the limiter amplifier 16, which is the subject of the present divisional application and which drives the power amplifier 17.

The pulse width modulator output pulses, of accurately controlled width, are obtained from the ends of the center-tapped secondary winding 98 of the transformer 96 and are applied directly to the bases 99 and 99′ of the transistors 101 and 101′, respectively, of the limiter amplifier 16. Transformer loads 102 and 102′ are connected between the respective transistor bases 99, 99′ and the center tap of the transformer secondary winding 98, which center tap is grounded through the lead 100. A parallel connected diode 104 and capacitor 106 connects the emitters 108 and 108′ of the transistors 101 and 101′ to the common ground through the lead wire 100 to provide cut-off bias in the absence of input during the dwell period between successive positive and negative going pulses from the pulse width modulator. If desired, the diode 104 and capacitor 106 arrangement may be replaced with a suitable parallel resistor-capacitor combination to form a self-biasing arrangement. With either capacitor-diode arrangement shown, or the capacitor-resistor arrangement described, the components of proper value are chosen to insure maintenance of a cut-off bias on both sides of the limiter amplifier push-pull system during the dwell period up to the highest operating temperature at which the apparatus is designed to operate. Runaway in the limiter amplifier is thereby prevented.

The output from the transistor 101, taken from the collector 109, is joined to one side of the primary winding 111 of preferably air gapped transformer 112, while the output from the transistor 101′ is taken from the collector 109′ and connected to one side of the primary winding 111′ of a transformer 112′ similar to transformer 112. The two free ends of the transformer primary windings are connected together. Transformers 112 and 112′ are each driven one way only by transistors 101 and 101′, respectively. In order that the magnetic cores of these transformers may be demagnetized sufficiently after one drive period before the arrival of succeeding drive pulses, an air gap is preferably included in the magnetic circuit thereof. During the drive period energy is stored in the transformers which would normally cause relatively high transient voltages at the moment of cut off of the drive transistors. Such transient voltages developed across the transistors 101 and 101′, when the transistors are switched to the off condition, are controlled by the series connected resistor 123 and diode 125 connected across the primary winding 111 of the transformer 112, and the series connected resistor 124 and diode 125′ connected across the transformer primary winding 111′ of the transformer 112′. Failure of the transistors 101 and 101′, due to excessive transient voltages, is prevented by the above series connected resistor and diode combinations across the transformer primary windings.

A variable supply potential is supplied to the collectors 109 and 109′, of the transistors 101 and 101′, through the lead wire 113 connected to the common point of the transformer primary windings 111 and 111′, the supply potential varying directly in relation to the power demands of the inverter. This is accomplished by means of a current transformer 147 having a primary winding 146 connected in series with the inverter output circuit 13, whereby the current flowing through the winding 146 varies directly with the inverter output current. One center-tapped secondary winding 156 energizes the rectifier network 18, which includes a pair of diodes 157, 157', the center tap of the secondary winding 156 being connected directly to the negative supply source 29. The output from the rectifier network 18, at the lead 113, includes the negative supply potential and the rectified output voltage of the secondary winding 156, a filter capacitor 158 being connected between the lead wire 113 and the negative side of the power source (battery) 29. This combined potential at the lead 113 provides the D.-C. supply to the transistors of the limiter amplifier 161 whereby such amplifier output (and, consequently, the drive power for the power amplifier 17), varies directly with the output current demands of the inverter.

The two separate output transformers 112 and 112', of the limiter amplifier, together with the resistor-diode combinations connected in shunt with the transformer primary windings 111 and 111', provides another feature of practical significance in electronic circuitry. In the case of the power inverter, the output of the limiter amplifier is fed to a power amplifier 17 consisting of two push-pull amplifier arrangements, the outputs of which are connected in parallel. The separate transformers 112 and 112' individually drive the two halves of the push-pull power amplifier. During the relaxation period, corresponding to the off conditions of the transformers 112 and 112', a reverse voltage, decaying exponentially with time, appears across the secondary windings of the individual transformers to provide a reverse bias voltage for the power amplifier transistors, thereby to prevent runaway of the power amplifier. The duration and initial magnitude of such reverse bias voltage is controlled by the values of the resistors 123, 124 and the diodes 125, 125' which are shunted across the individual primary windings 111 and 111'.

Having now described the invention, what I desire to protect by Letters Patent is set forth in the following claims.

I claim:

1. Electronic apparatus comprising, (a) a first amplifier having a pair of transistors each having input and output terminals;

(b) a pair of magnetically-isolated transformers each having a primary winding and a secondary winding;

(c) circuit elements connecting the primary windings of the transformers in series across corresponding output terminals of the first amplifier transistors;

(d) a source of D.-C. supply potential connected between the common junction of the primary windings and the other output terminals of the first amplifier transistors;

(e) means applying an A.-C. input signal across the input terminals of the first amplifier transistors for alternately switching the transistors from off to on conditions;

(f) a power amplifier having a pair of transistors connected in push-pull arrangement, the input terminals of these transistors being individually connected to respective secondary windings of the transformers;

(g) a first diode connected across the primary winding of one transformer; and (h) a second diode connected across the primary winding of the other transformer in a sense opposite to that of the first diode.

2. The invention as recited in claim 1, including individual resistors connected in series with each of said diodes.

References Cited by the Examiner

UNITED STATES PATENTS

| | | | |
|---|---|---|---|
| 1,904,103 | 4/1933 | Thorington | 330—120 |
| 2,819,352 | 1/1958 | Houck | 330—15 X |
| 2,835,748 | 5/1958 | Ensink et al. | 330—15 X |
| 2,884,545 | 4/1959 | Houck | |
| 3,015,780 | 1/1962 | Schayes et al. | 330—15 X |
| 3,015,781 | 1/1962 | Eklov | 330—15 |

ROY LAKE, *Primary Examiner.*

NATHAN KAUFMAN, *Examiner.*

F. D. PARIS, *Assistant Examiner.*